US012623752B2

(12) United States Patent
Wang et al.

(10) Patent No.: US 12,623,752 B2
(45) Date of Patent: May 12, 2026

(54) BICYCLE SPROCKET ASSEMBLY

(71) Applicant: AD-II Engineering Inc., Taichung City (TW)

(72) Inventors: Chien-Pin Wang, Taichung City (TW); Kuei-Jung Chang, Taichung City (TW)

(73) Assignee: AD-II Engineering Inc., Taichung City (TW)

( * ) Notice: Subject to any disclaimer, the term of this patent is extended or adjusted under 35 U.S.C. 154(b) by 0 days.

(21) Appl. No.: 18/921,356

(22) Filed: Oct. 21, 2024

(65) Prior Publication Data

US 2026/0109429 A1 Apr. 23, 2026

(51) Int. Cl.
B62M 9/10 (2006.01)
(52) U.S. Cl.
CPC ..................................... B62M 9/10 (2013.01)
(58) Field of Classification Search
CPC ....................................................... B62M 9/10
See application file for complete search history.

(56) References Cited

U.S. PATENT DOCUMENTS

| | | | |
|---|---|---|---|
| 11,351,815 B2 * | 6/2022 | Thrash | ................... B60B 27/04 |
| 11,548,592 B2 * | 1/2023 | Tsai | ...................... F16D 1/0864 |
| 2012/0225745 A1 * | 9/2012 | Oishi | ..................... B62M 9/125 |
| | | | 474/160 |
| 2019/0054765 A1 * | 2/2019 | Thrash | ................ F16H 57/0025 |
| 2020/0062033 A1 * | 2/2020 | Bots | .......................... F16D 1/10 |
| 2022/0017180 A1 * | 1/2022 | Thrash | .................... B62M 9/10 |

FOREIGN PATENT DOCUMENTS

WO WO-2022015790 A1 * 1/2022 ............. B62M 9/10

* cited by examiner

*Primary Examiner* — Victoria P Augustine
*Assistant Examiner* — Mark K Buse
(74) *Attorney, Agent, or Firm* — MUNCY, GEISSLER, OLDS & LOWE, P.C.

(57) ABSTRACT
A bicycle sprocket assembly is provided, configured to be disposed on a cassette body, including: a sprocket set and a restricting mechanism. The sprocket set includes a sleeving portion configured to be sleeved on the cassette body in an axial direction. The restricting mechanism includes at least one urging unit disposed on the sleeving portion, and each of the at least one urging unit is at least partially adjustable to move and abut against the cassette body. Therefore, the bicycle sprocket assembly can be assembled to the existing cassette body, which has a wide range of applications and effectively reduces costs.

8 Claims, 5 Drawing Sheets

BICYCLE SPROCKET ASSEMBLY

BACKGROUND OF THE INVENTION

Field of the Invention

The present invention relates to a bicycle sprocket assembly.

Description of the Prior Art

According to the connection of a freewheel and a cassette body of a hub, the freewheel can be classified under a thread-on freewheel or a cassette. The thread-on freewheel is screwed to an outer thread of the cassette body (such as SRAM-XDR cassette body) by an inner thread disposed thereon, and the cassette is non-rotatably sleeved to the cassette body (such as Shimano driver body) and restricted between the cassette body and a cover connected to the cassette body. The cassette does not have an inner thread and is engaged with the cassette body by splines so that the cassette and the thread-on freewheel have to be used with different types of cassette bodies.

When the original thread-on freewheel is replaced with the cassette, the original cassette body has to be replaced together. Moreover, the hub also has to be replaced when the driver body is non-detachable from the hub, which is high cost and inconvenient to use.

The present invention is, therefore, arisen to obviate or at least mitigate the above-mentioned disadvantages.

SUMMARY OF THE INVENTION

The main object of the present invention is to provide a bicycle sprocket assembly, which can be assembled to an existing cassette body, has a wide range of applications and effectively reduces costs.

To achieve the above and other objects, the present invention provides a bicycle sprocket assembly configured to be disposed on a cassette body, including: a sprocket set and a restricting mechanism. The sprocket set includes a sleeving portion configured to be sleeved on the cassette body in an axial direction. The restricting mechanism includes at least one urging unit disposed on the sleeving portion, and each of the at least one urging unit is at least partially adjustable to move and abut against the cassette body.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
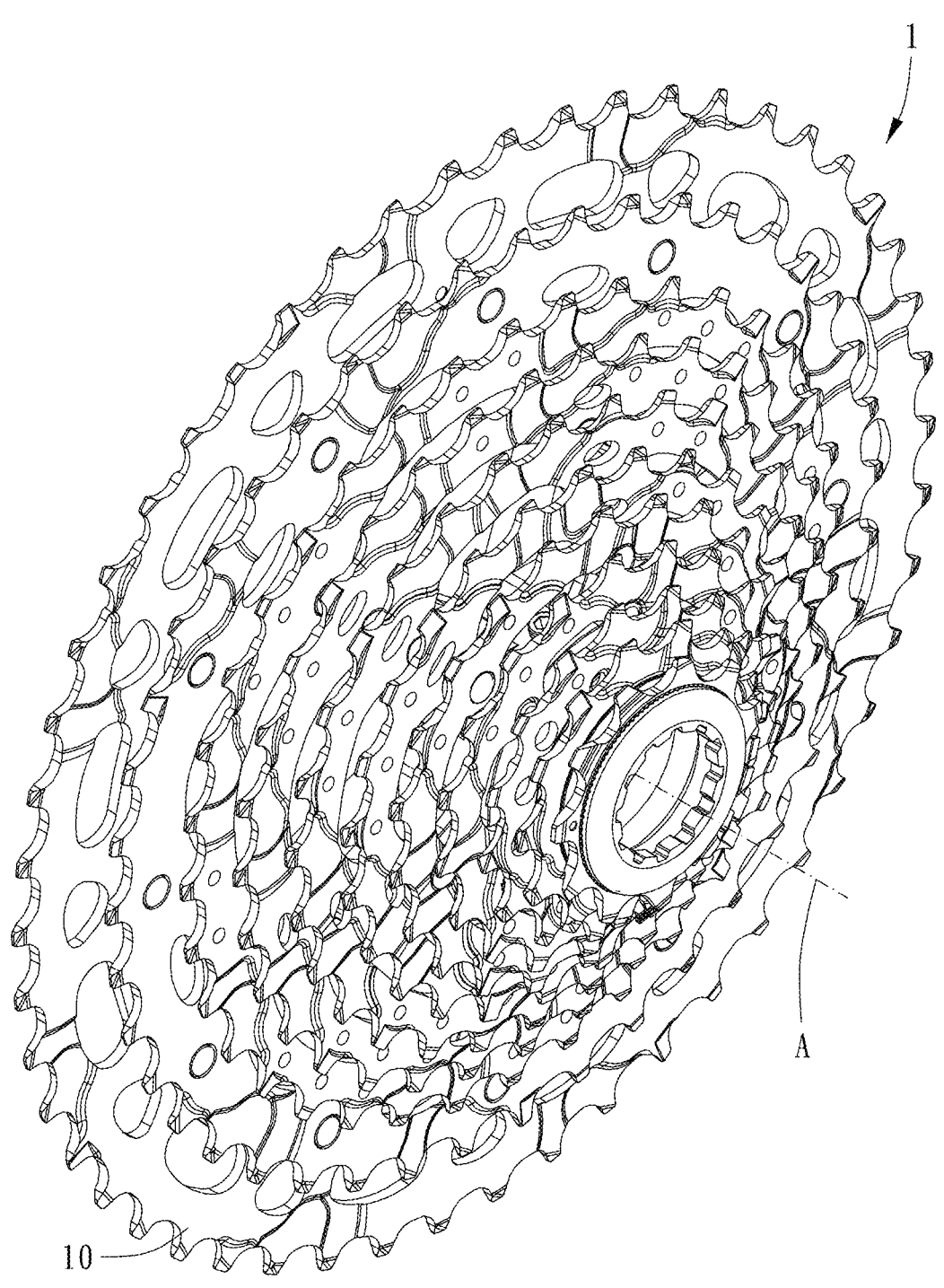
FIG. 1 is a stereogram of a preferable embodiment of the present invention.
Figure 2:
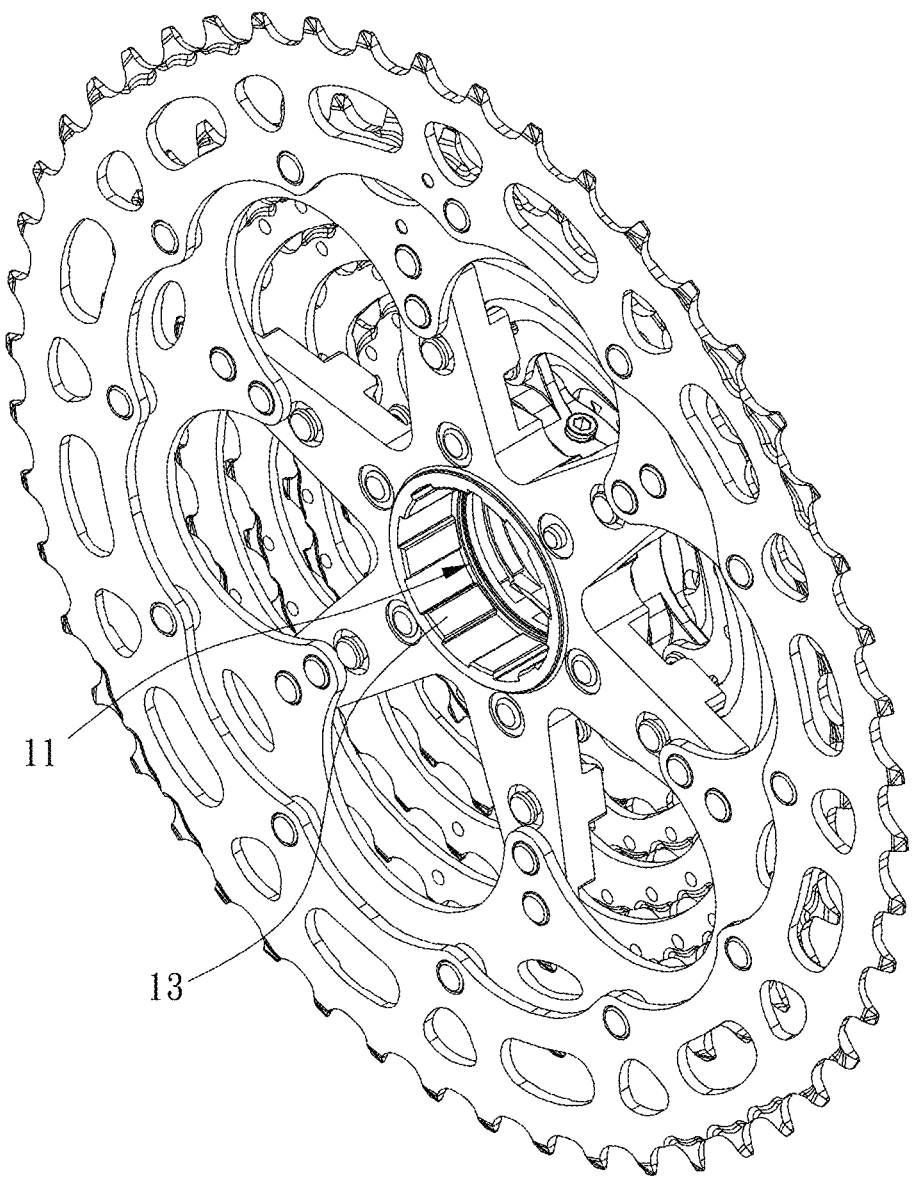
FIG. 2 is a stereogram from another perspective of a preferable embodiment of the present invention.
Figure 3:
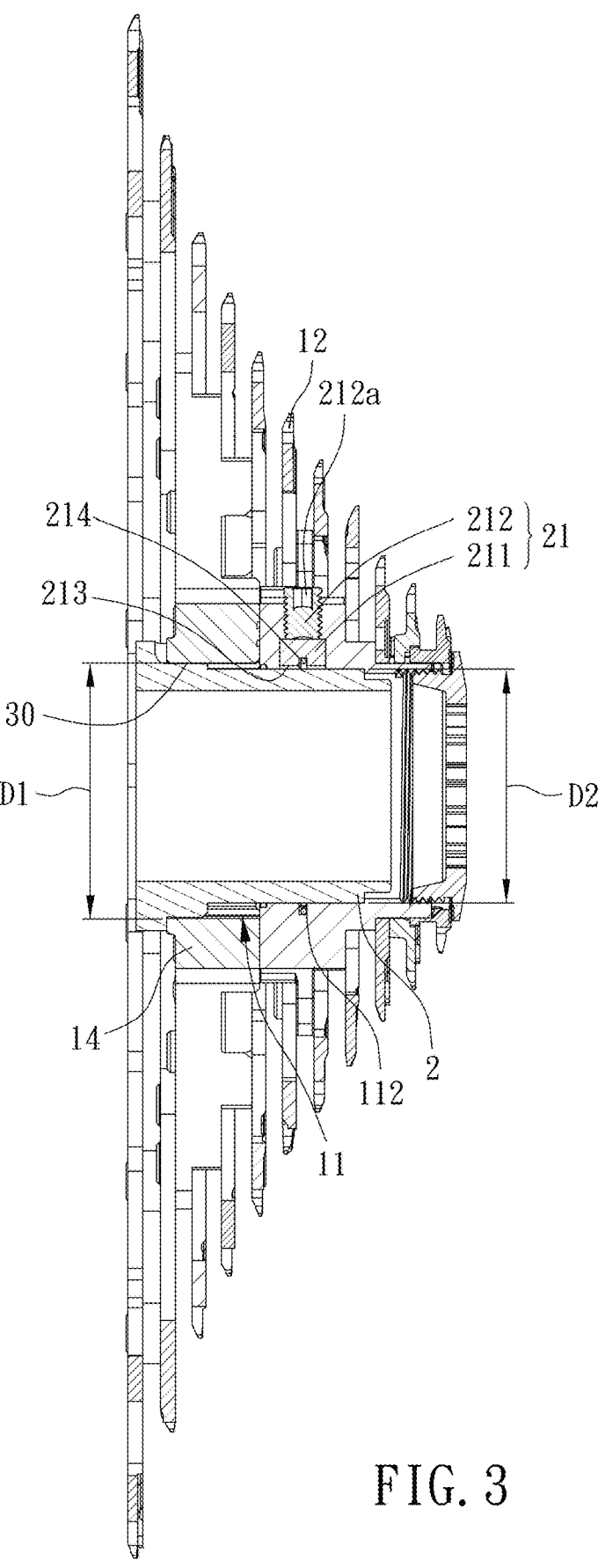
FIG. 3 is a cross-sectional view of a preferable embodiment of the present invention when assembled to a cassette body.

Please refer to FIGS. 1 to 5 for a preferable embodiment of the present invention. A bicycle sprocket assembly 1 of the present invention is configured to be disposed on a cassette body 2 and includes a sprocket set 10 and a restricting mechanism 20.

The sprocket set 10 includes a sleeving portion 11 configured to be sleeved on the cassette body 2 in an axial direction A. The restricting mechanism 20 includes at least one urging unit 21 disposed on the sleeving portion 11, and each of the at least one urging unit 21 is at least partially adjustable to move and abut against the cassette body 2. Therefore, the bicycle sprocket assembly 1 can replace an existed sprocket assembly without replacing the cassette body 2, which is easy to be assembled and effectively reduces costs.

Figure 4:
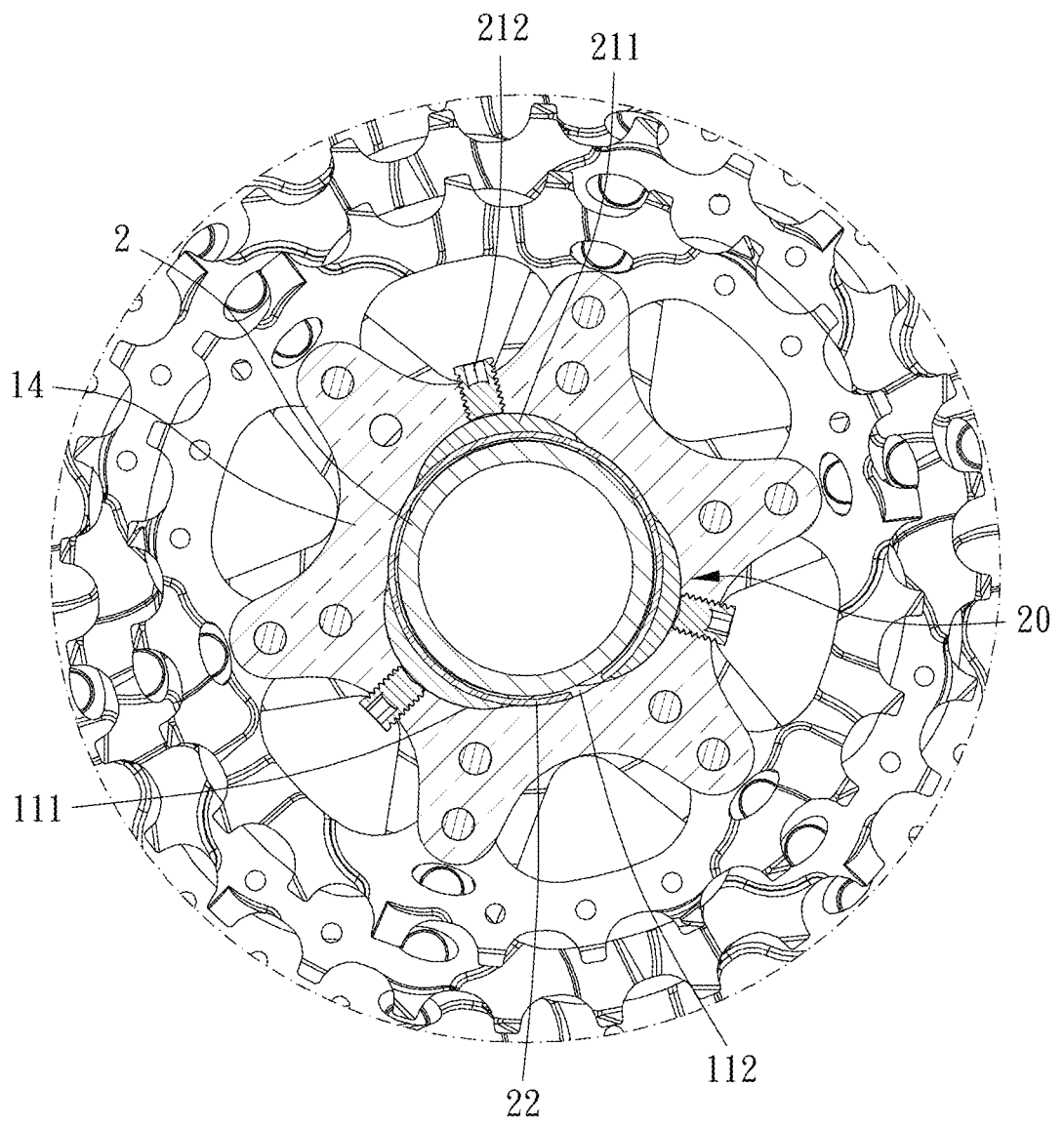
FIG. 4 is a partial cross-sectional view of a preferable embodiment of the present invention when assembled to a cassette body.

Each of the at least one urging unit 21 is movable relative to the sleeving portion 11 in a direction lateral to the axial direction A, and the at least one urging unit 21 is configured to be abutted against the cassette body 2 in a direction toward a radial inner side of the sleeving portion 11. In this embodiment, the restricting mechanism 20 includes a plurality of said urging units 21, and the plurality of said urging units 21 are arranged equiangularly as viewed in the axial direction A so as to be evenly and radially abutted against on an outer circumferential wall of the cassette body 2 for good stability. Specifically, an inner circumferential wall of the sleeving portion 11 has a plurality of receiving grooves 111 recessed thereon, each of the plurality of said urging units 21 includes a push block 211 movably received within one of the plurality of receiving grooves 111, and each said push block 211 is configured to be radially abutted against the cassette body 2. Each of the plurality of said urging units 21 further includes a fastener 212 radially screwed to the sleeving portion 11, an end of each said fastener 212 is abutted against a radial outer side of one said push block 211, and each said fastener 212 is configured to be rotated to drive one said push block 211 to move in a direction radially toward an inner side of the sleeving portion 11. In assembling, the sleeving portion 11 is sleeved to the cassette body 2, and said fasteners 212 are rotated to drive said push blocks 211 to be abutted against the cassette body 2, as shown in FIG. 4, which is easy to be operated and provides good assembling stability. Moreover, a direction that each of the plurality of said urging units 21 urging the cassette body 2 is not limited to a radial direction extending through the axial direction A, each of the plurality of said urging units 21 may urge the cassette body 2 in a direction close to the radial direction and toward the inner side of the sleeving portion 11 to achieve similar effects. In other embodiments, each said urging unit may urge the cassette body by the said fasteners without said push blocks. Preferably, each said push block 211 includes an abutting surface 213 extending arcuately and facing toward the cassette body 2, and said abutting surfaces 213 define a circular profile as viewed in the axial direction A. Each said abutting surface 213 extends along at least ⅕ of the circular profile so as to correspond to a cross-sectional profile of the cassette body 2 for stable assembling. The restricting mechanism 20 further includes at least one elastic member 22, and the at least one elastic member 22 is connected with each said push block 211 so that each said push block 211 has a tendency to move in a direction remote from the cassette body 2, which provides stable assembling stability and prevents said push blocks 211 from falling off. In this embodiment, the at least one elastic member 22 is a C-shaped elastic ring, and each said push block 211 has an engaging groove 214 facing toward the cassette body 2. The inner circumferential wall of the sleeving portion 11 further has a plurality of communicating grooves 112 extending between the plurality of receiving grooves 111, and the C-shaped elastic ring is received within said engaging grooves 214 and the plurality of communicating grooves 112. As viewed in the axial direction A, a thickness of each said push block 211 is gradually decreased toward two opposite sides of one said fastener 212. Therefore, when one said push block 211 is urged by one said fastener 212, the said push block 211 is urged to deform to fit with the outer circumferential wall of the cassette body 2. For example, each said push block 211 is made of a material including at least one of rubber, plastic and metal so as to be deformable to increase assembling stability. Each said abutting surface may be embossed or have anti-slip bumps for anti-slip effect.

Figure 5:
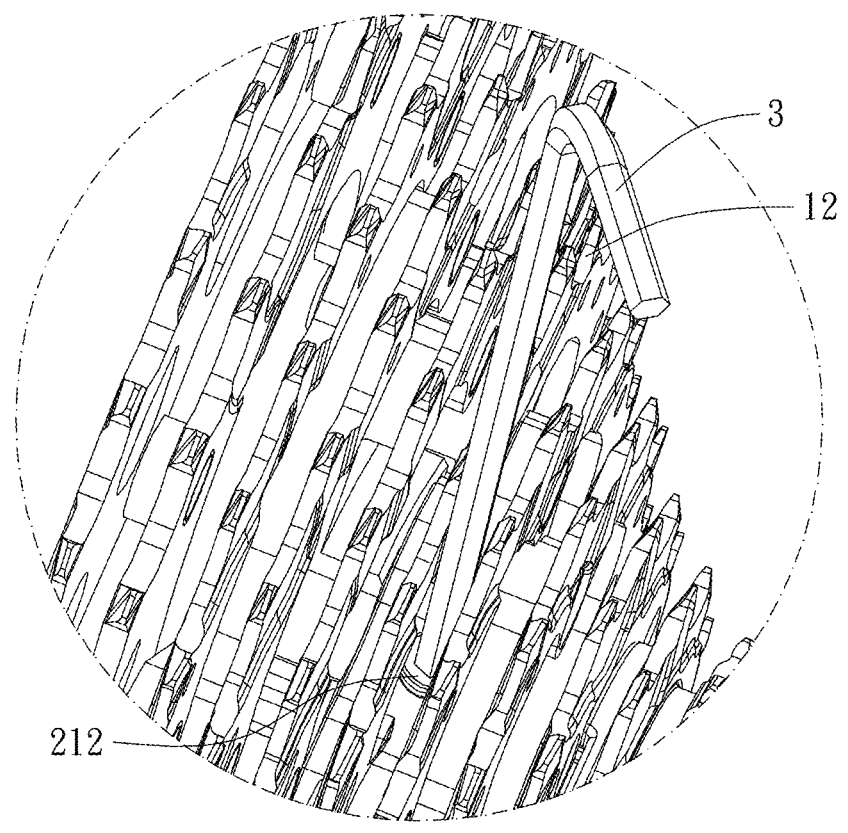
FIG. 5 is a schematic diagram showing assembling of a preferable embodiment of the present invention.

The sprocket set 10 further includes a plurality of sprockets 12 protrudingly disposed on a radial outer side of the sleeving portion 11, each said fastener 212 is located between adjacent two of the plurality of sprockets 12, and a driving hole 212a or a driving head of each said fastener 212 configured to be connected with a driving tool 3 has a diametrical dimension being smaller than or equal to an interval between adjacent two of the plurality of sprockets 12, which allows the driving tool 3 to be inserted between two said sprockets 12 to rotate the said fasteners 212, as shown in FIG. 5. In this embodiment, the driving hole 212a of each said fastener 212 is a hexagonal hole for stable rotation.

Moreover, the sprocket set 10 further includes a first engaging portion 13, and the first engaging portion 13 is configured to be engaged with a second engaging portion 30 of the cassette body 2 so as to prevent the bicycle sprocket assembly 1 from being rotated relative to the cassette body 2. The sprocket set 10 further includes a plurality of brackets 14, the plurality of brackets 14 are detachably connected with one another in the axial direction A, and the plurality of sprockets 12 are respectively connected to the plurality of brackets 14 for easy processing and assembling. The plurality of brackets 14 have the first engaging portion 13 and the plurality of urging units 21 disposed thereon, and the plurality of brackets 14 define the sleeving portion 11. In other embodiments, the plurality of brackets may have only one said bracket and the plurality of sprockets are connected to the said bracket.

Preferably, a diametrical dimension D1 of an end of the sleeving portion 11 close to the first engaging portion 13 is larger than a diametrical dimension D2 of an end of the sleeving portion 11 remote from the first engaging portion 13. Therefore, the first engaging portion 13 is easy to be engaged with the second engaging portion 30, and a side of the sleeving portion 11 remote from the first engaging portion 13 is close to the outer circumferential surface of the cassette body 2 for easy adjustment of the restricting mechanism 20.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle sprocket assembly, configured to be disposed on a cassette body, including:
   a sprocket set, including a sleeving portion configured to be sleeved on the cassette body in an axial direction; and
   a restricting mechanism, including at least one urging unit disposed on the sleeving portion, each of the at least one urging unit being at least partially adjustable to move and abut against the cassette body;
   wherein each of the at least one urging unit is movable relative to the sleeving portion in a direction lateral to the axial direction, and the at least one urging unit is configured to be abutted against the cassette body in a direction toward a radial inner side of the sleeving portion;
   wherein the sprocket set further includes a plurality of sprockets protrudingly disposed on a radial outer side of the sleeving portion, each of the at least one urging unit includes a fastener radially screwed to the sleeving portion, each said fastener is located between adjacent two of the plurality of sprockets, and a driving hole or a driving head of each said fastener configured to be connected with a driving tool has a diametrical dimension being smaller than or equal to an interval between adjacent two of the plurality of sprockets.

2. The bicycle sprocket assembly of claim 1, wherein the sprocket set includes a plurality of brackets, the plurality of brackets are detachably connected with one another in the axial direction, and the plurality of sprockets are respectively connected to the plurality of brackets.

3. The bicycle sprocket assembly of claim 1, wherein the sprocket set includes a bracket and the plurality of sprockets are connected to the bracket.

4. The bicycle sprocket assembly of claim 1, wherein the sprocket set includes a first engaging portion, the first engaging portion is configured to be engaged with a second engaging portion of the cassette body.

5. A bicycle sprocket assembly, configured to be disposed on a cassette body, including:
   a sprocket set, including a sleeving portion configured to be sleeved on the cassette body in an axial direction; and
   a restricting mechanism, including at least one urging unit disposed on the sleeving portion, each of the at least one urging unit being at least partially adjustable to move and abut against the cassette body;
   wherein an inner circumferential wall of the sleeving portion has a plurality of receiving grooves recessed thereon, each of the at least one urging unit includes a push block movably received within one of the plurality of receiving grooves, and each said push block is configured to be radially abutted against the cassette body.

6. The bicycle sprocket assembly of claim 5, wherein each of the at least one urging unit further includes a fastener radially screwed to the sleeving portion, an end of each said fastener is abutted against a radial outer side of one said push block, and each said fastener is configured to be rotated to drive one said push block to move in a direction radially toward an inner side of the sleeving portion.

7. The bicycle sprocket assembly of claim 6, wherein each of the at least one urging unit is movable relative to the sleeving portion in a direction lateral to the axial direction, and the at least one urging unit is configured to be abutted against the cassette body in a direction toward a radial inner side of the sleeving portion; the sprocket set further includes a plurality of sprockets protrudingly disposed on a radial outer side of the sleeving portion, each said fastener is located between adjacent two of the plurality of sprockets, and a driving hole or a driving head of each said fastener configured to be connected with a driving tool has a diametrical dimension being smaller than or equal to an interval between adjacent two of the plurality of sprockets; the driving hole of each said fastener is a hexagonal hole; each said push block is made of a material including at least one of rubber, plastic and metal; the restricting mechanism further includes at least one elastic member, the at least one elastic member is connected with each said push block so that each said push block has a tendency to move in a direction remote from the cassette body; the at least one elastic member is a C-shaped elastic ring, each said push block has an engaging groove facing toward the cassette body, the inner circumferential wall of the sleeving portion further has a plurality of communicating grooves extending between the plurality of receiving grooves, the C-shaped elastic ring is received within said engaging grooves and the plurality of communicating grooves; the sprocket set further includes a first engaging portion, the first engaging portion is configured to be engaged with a second engaging portion of the cassette body; the sprocket set further includes a plurality of brackets, the plurality of brackets have a plurality of said urging units and the first engaging portion disposed thereon, the plurality of brackets define the sleeving portion; and a diametrical dimension of an end of the sleeving portion close to the first engaging portion is larger than a diametrical dimension of an end of the sleeving portion remote from the first engaging portion.

8. The bicycle sprocket assembly of claim 5, wherein the restricting mechanism further includes at least one elastic member, and the at least one elastic member is connected with each said push block so that each said push block has a tendency to move in a direction remote from the cassette body.

* * * * *